US008368685B2

(12) United States Patent
Arai

(10) Patent No.: US 8,368,685 B2
(45) Date of Patent: Feb. 5, 2013

(54) IMAGE DISPLAY APPARATUS

(75) Inventor: Yutaka Arai, Atsugi (JP)

(73) Assignee: NEC Display Solutions, Ltd., Tokyo (JP)

( * ) Notice: Subject to any disclaimer, the term of this patent is extended or adjusted under 35 U.S.C. 154(b) by 805 days.

(21) Appl. No.: 12/159,059

(22) PCT Filed: Dec. 15, 2006

(86) PCT No.: PCT/JP2006/325048
§ 371 (c)(1), (2), (4) Date: Jun. 24, 2008

(87) PCT Pub. No.: WO2007/074661
PCT Pub. Date: Jul. 5, 2007

(65) Prior Publication Data

US 2009/0046091 A1 Feb. 19, 2009

(30) Foreign Application Priority Data

Dec. 28, 2005 (JP) ................................ 2005-376940

(51) Int. Cl.
*G06F 3/038* (2006.01)
*G09G 5/00* (2006.01)

(52) U.S. Cl. ........................................................ 345/214

(58) Field of Classification Search .................. 345/214, 345/659, 99, 101, 76; 236/78 R; 315/169.3
See application file for complete search history.

(56) References Cited

U.S. PATENT DOCUMENTS 3,974,426 A * 8/1976 Gingras ........................ 361/211
4,857,903 A * 8/1989 Zalenski ....................... 345/166
5,396,257 A 3/1995 Someya et al.
6,935,572 B1 * 8/2005 Smole ......................... 236/78 R
7,259,772 B2 * 8/2007 Koh ............................. 345/659
7,742,789 B1 * 6/2010 Takayama et al. ............ 455/566
2003/0214467 A1 * 11/2003 Koyama et al. ................. 345/82
(Continued)

FOREIGN PATENT DOCUMENTS

EP 1548573 A1 6/2005
EP 1672706 A1 6/2006
(Continued)

OTHER PUBLICATIONS

Notice of Reasons for Rejection dated Aug. 30, 2011 from the Japanese Patent Office in counterpart Japanese Patent Application No. 2005376940.

*Primary Examiner* — Alexander S Beck
*Assistant Examiner* — Joseph Pena
(74) *Attorney, Agent, or Firm* — Sughrue Mion, PLLC

(57) ABSTRACT

In an image display apparatus of the invention, a signal input unit outputs a complex image signal, which has been converted to an easily-processed format, to a signal-for-display generator. The signal-for-display generator converts the complex image signal to a signal suitable for displaying at a display unit. An apparatus state-detector detects a state of the display apparatus. Based on apparatus state information input from the apparatus state-detector, an arithmetic unit calculates an amount of non-uniformity to be corrected, and outputs it to a non-uniformity corrector. Based on the non-uniformity correction amount corresponding to a position displayed at the display unit, the non-uniformity corrector corrects the image signal input from the signal-for-display generator, converts it to a signal format that can be used at the display unit, and outputs it.

8 Claims, 3 Drawing Sheets

U.S. PATENT DOCUMENTS

| | | | | |
|---|---|---|---|---|
| 2004/0201564 | A1* | 10/2004 | Sugino et al. | 345/101 |
| 2005/0122305 | A1 | 6/2005 | Murao et al. | |
| 2005/0212764 | A1* | 9/2005 | Toba | 345/156 |
| 2006/0139264 | A1* | 6/2006 | Choi et al. | 345/76 |
| 2007/0145902 | A1* | 6/2007 | Yaguchi et al. | 315/169.3 |

FOREIGN PATENT DOCUMENTS

| | | | |
|---|---|---|---|
| JP | 4-207678 | A | 7/1992 |
| JP | 11-109885 | A | 4/1999 |
| JP | 2000-81607 | A | 3/2000 |
| JP | 2000-89197 | A | 3/2000 |
| JP | 2004-151672 | A | 5/2004 |
| JP | 2005-215059 | A | 8/2005 |
| WO | 99/48012 | A1 | 9/1999 |

* cited by examiner

IMAGE DISPLAY APPARATUS

TECHNICAL FIELD

The present invention relates to an image display apparatus for receiving an image signal having a predetermined format, used in a personal computer (hereinafter 'PC') and the like, from an image signal-generation apparatus such as a PC, and displaying the received signal on a display device such as a liquid crystal, CRT, plasma display, or electroluminescence.

Priority is claimed on Japanese Patent Application No. 2005-376940, filed Dec. 28, 2005, the content of which is incorporated herein by reference.

BACKGROUND ART

FIG. 6 is a diagram of an image display system used for displaying an intended image. This image display system includes an image signal generation apparatus 11, an image signal generator 12 contained in the image signal generation apparatus 11, and an image display apparatus 13.

In FIG. 6, the image signal generation apparatus 11 has an internal image signal generator 12, and outputs an image signal generated by this image signal generator 12. The image signal output from the image signal generation apparatus 11 is displayed at the image display apparatus 13.

FIG. 7 is a block diagram of the internal configuration of an image display apparatus 13 used in a conventional image display system such as that disclosed in Patent Document 1. The image display apparatus in FIG. 7 includes a signal input unit 21, a signal-for-display generator 22, a non-uniformity corrector 23, and a display unit 24.

Subsequently, an operation of the image display apparatus shown in FIG. 7 will be explained using FIGS. 6 and 7. As shown in FIG. 6, the image signal output from the image signal generation apparatus 11 is input to the image display apparatus 13. At this time, as shown in FIG. 7, the image signal is input to the signal input unit 21 of the image display apparatus.

The signal input unit 21 converts the image signal, which is received in a predetermined format, to a format that can be processed in the image display apparatus, and outputs it to the signal-for-display generator 22. As the signal input unit 21, it is conventional to use an analog-digital converter that converts an analog image signal to a digital signal, a digital signal processing circuit that converts a serial digital signal to a parallel digital signal, and the like.

The signal-for-display generator 22 receives the image signal output from the signal input unit 21, converts it to an image signal that can be displayed by the display unit 24, and outputs it. Specifically, it converts the resolution and frequency of the image signal such that they can be displayed using a display element.

With respect to the image signal generated by the signal-for-display generator 22, the non-uniformity corrector 23 sets a correction amount for each display position, and outputs a corrected signal. As a correcting means, there are a method of passing the image signal itself through a multiplier and changing the multiplication amount at each display position, and a method of using a lookup table to add/subtract a correction amount corresponding to a display position to/from the image signal.

The display unit 24 receives and displays an image signal output from the non-uniformity corrector 23.

While the non-uniformity corrector 23 is provided in a rear stage of the signal-for-display generator 22, similar effects can be achieved by providing it in a front stage of the signal-for-display generator 22. As another correction means, non-uniformity is corrected by controlling the light source at each position in a transmission-type display apparatus using liquid crystal or the like; since this method does not correct the image signal itself, it can be provided separate from the flow of the image signal.

Patent Document 1: Japanese Unexamined Patent Application, First Publication No. 11-109885

However, conventional image display apparatuses have a drawback that the element used for display generates non-uniformity on the screen, whereby uniform display becomes impossible. Although there are several image display apparatuses that include means of correcting non-uniformity, the non-uniformity correction amount in each of these existing apparatuses is fixed. However, non-uniformity generated in a display element is greatly affected by the temperature and the like of the display element, and cannot be completely corrected with a fixed correction amount.

DISCLOSURE OF INVENTION

To solve these problems, it is an object of the invention to correct non-uniformity and display a uniform image without non-uniformity, even when using a display element that generates display non-uniformity, and to ensure that a similar effect is achieved under any conditions. That is, it is an object of the invention to provide an image display apparatus that, in an image display system such as that shown in FIG. 6, can constantly display a uniform image across an entire screen, as desired by a user.

An image display apparatus of the present invention includes: a signal input unit that receives a complex image signal including an image signal having a plurality of frames and a synchronization signal corresponding to the image signal, and outputs the image signal and the synchronization signal; a signal-for-display generator that converts a signal input from the signal input unit to a signal for displaying with a display element; a non-uniformity corrector that corrects non-uniformity in the display element; an apparatus state-detector that detects a state of a display apparatus including the display element; an arithmetic unit that calculates a correction amount based on a detection result of the apparatus state-detector, and outputs the correction amount to the non-uniformity corrector; and a display unit that receives a complex image signal corrected by the non-uniformity corrector, and displays the corrected complex image signal.

It is preferable that, in the image display apparatus of the invention, the apparatus state-detector includes an apparatus-orientation detector that detects an orientation of the display apparatus.

It is preferable that, in the image display apparatus of the invention, the apparatus state-detector includes an apparatus-temperature detector that detects a temperature of the display apparatus.

It is preferable that, in the image display apparatus of the invention, the apparatus state-detector includes an apparatus operating-time detector that detects an operating time of the display apparatus.

It is preferable that, in the image display apparatus of the invention, the arithmetic unit includes a storage unit that pre-stores non-uniformity correction conditions corresponding to states of the display apparatus, and the arithmetic unit compares the non-uniformity correction conditions with a state of the apparatus detected by the apparatus state-detector, selects a non-uniformity correction condition corresponding to a comparison result, and outputs it.

It is preferable that, in the image display apparatus of the invention, the arithmetic unit includes a storage unit that pre-stores a portion of non-uniformity correction conditions corresponding to states of the display apparatus, and the arithmetic unit outputs a non-uniformity correction condition by comparing the correction conditions with a state of the apparatus detected by the apparatus state-detector, and performing an arithmetic operation based on a correction condition approximating to a state of the apparatus.

It is preferable that, in the image display apparatus of the invention, the arithmetic unit includes a storage unit that pre-stores an arithmetic expression leading to a non-uniformity correction condition corresponding to a state of the apparatus, and the arithmetic unit calculates a non-uniformity correction condition based on a state of the apparatus detected by the apparatus state-detector.

It is preferable that, in the image display apparatus of the invention, the arithmetic unit includes an input unit that obtains, from outside, a timing of changing a non-uniformity correction amount.

It is preferable that, in the image display apparatus of the invention, the arithmetic unit monitors the detection result of the apparatus state-detector, and constantly controls the non-uniformity corrector so as to reduce non-uniformity generated at the display unit.

It is preferable that, in the image display apparatus of the invention, the arithmetic unit monitors the detection result of the apparatus state-detector, and, when a state of the apparatus alters by a fixed amount from a state of the apparatus at a previous correction, controls the non-uniformity corrector so as to reduce non-uniformity generated at the display unit.

It is preferable that, in the image display apparatus of the invention, the arithmetic unit controls the non-uniformity corrector so as to reduce non-uniformity generated at the display unit, based on an externally-applied control signal and the detection result of the apparatus state-detector.

According to the invention, it is possible to realize an image display apparatus that can constantly display a uniform image across an entire screen, as desired by a user.

BRIEF DESCRIPTION OF THE DRAWINGS

FIG. 4 is a temperature distribution transition diagram showing changes in temperature distribution after the power of an image display apparatus is switched on.

BEST MODES FOR CARRYING OUT THE INVENTION

An embodiment of an image display apparatus according to the invention will be explained in detail in reference to the drawings.

Figure 6:
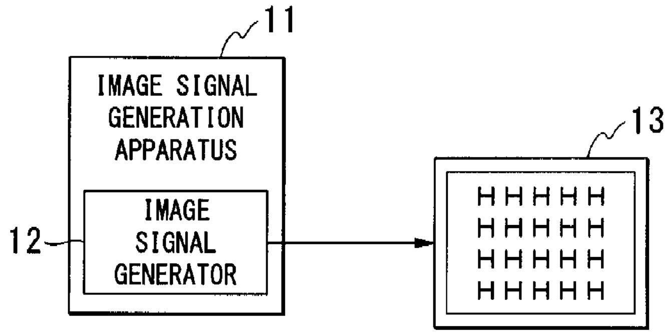
FIG. 6 is a diagram showing a general image display system.
Figure 7:
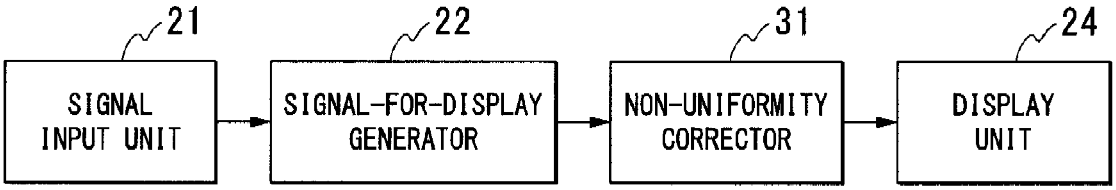
FIG. 7 is a block diagram showing an image display apparatus according to conventional techniques.

An image display system that is an application target for a first embodiment of the invention has basically the same configuration as the image display system in FIG. 6, which is shown as a conventional example. For this reason, an image display system according to a first embodiment similarly includes an image signal generation apparatus 11, an image signal generator 12 contained in the image signal generation apparatus 11, and an image display apparatus 13 (FIG. 6). An image signal output from the image signal generation apparatus 11 is connected to the image display apparatus 13 and displayed there.

An operation of this image display system will be explained as follows. The image signal generation apparatus 11 outputs a net image signal, that will actually be displayed in a display unit of the image display apparatus 13, and a synchronization signal corresponding to this image signal (hereinafter, these output signals are collectively referred to as 'complex image signal').

The complex image signal is output from the image signal generation apparatus 11 in a format suitable for transmission, and is supplied to the image display apparatus 13. The image display apparatus 13 converts the received complex image signal to an easily-processed format, and, after performing a process suitable for display, displays it on a display unit.

Since the operation of the image signal generation apparatus 11 in the image display system of the first embodiment is substantially the same as the conventionally used apparatus, it will not be explained here. The explanation here describes an operation of the image display apparatus 13 from receiving a complex image signal until displaying an image.

In a first step, a complex image signal in a format suitable for transmission output from the image signal generation apparatus 11 is received and converted to a format that can be easily processed in the apparatus. In a second step, the received image signal is then subjected to a process suitable for display, such as non-uniformity correction.

The second step includes steps (a), (b), and (c) in relation to non-uniformity correction, which will be explained in detail later. That is, first, (a) an amount of desired correction is input from the outside or read from an internal storage apparatus, (b) the amount of desired correction is converted to a correction amount for internal use, and (c) correction is performed in each correction circuit in accordance with the correction amount.

Subsequently, in a third step, the image signal processed in the second step is converted to a format for displaying it in a display unit and it is input to the display unit, and an image is displayed in the display unit.

Figure 1:
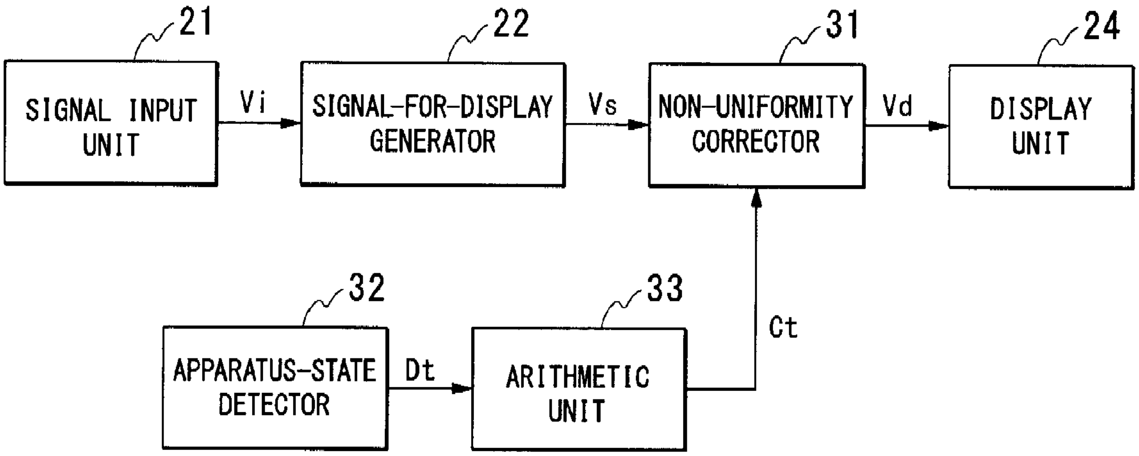
FIG. 1 is a block diagram showing an image display apparatus in a first embodiment of the invention.

Subsequently, the first embodiment of the invention will be explained in more detail while referring to the drawings. FIG. 1 is a block diagram of the internal configuration of the image display apparatus 13 shown in FIG. 6. As shown in FIG. 1, this image display apparatus includes a signal input unit 21, a signal-for-display generator 22, a non-uniformity corrector 31, an apparatus state-detector 32, an arithmetic unit 33, and a display unit 24.

The signal input unit 21 outputs an image signal Vi to the signal-for-display generator 22. The signal-for-display generator 22 generates an image signal Vs, and outputs to the non-uniformity corrector 31. The non-uniformity corrector 31 corrects the image signal Vs, and outputs a corrected image signal Vd to the display unit 24. The apparatus state-detector 32 outputs a signal Dt that indicates a detected apparatus state to the arithmetic unit 33. Based on the signal Dt, the arithmetic unit 33 outputs a signal Ct indicating an amount of non-uniformity correction to the non-uniformity corrector 31.

Subsequently, an operation of the image display apparatuses shown in FIG. 1 and FIG. 6 will be explained.

Figure 2:
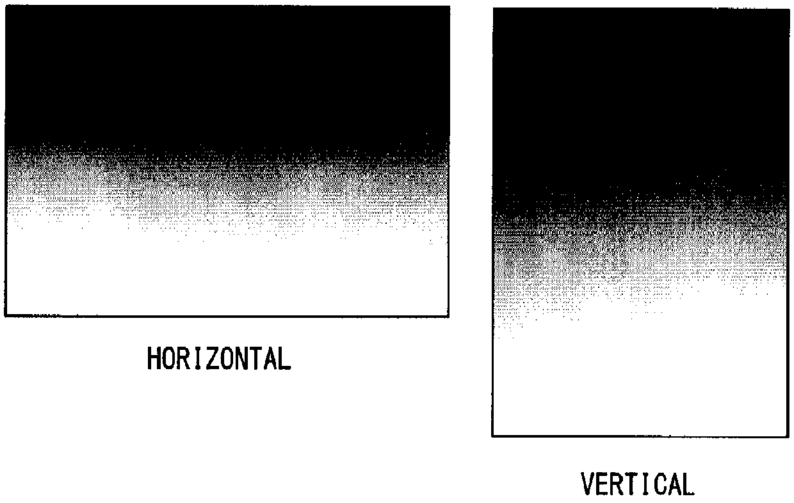
FIG. 2 is a temperature distribution diagram showing temperature distribution in an image display apparatus.

FIG. 2 is a virtual representation of temperature distribution at saturation according to display positions when the image display apparatus 13 is disposed horizontally, and when it is disposed vertically. In this figure, the dark sections represent sections of high temperature; the temperature increases toward the top and is not constant within the screen.

Figure 3:
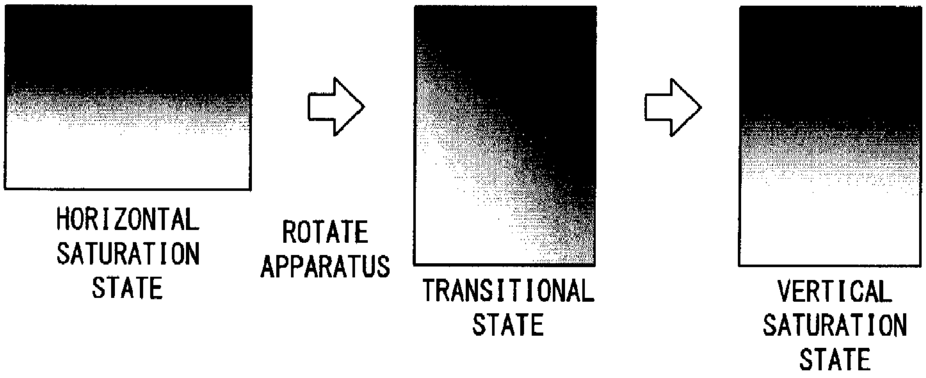
FIG. 3 is a temperature distribution transition diagram showing changes in temperature distribution according to change in the orientation of an image display apparatus.

FIG. 3 is a virtual representation of transitions in temperature distribution according to display positions when the image display apparatus 13 is changed from a state of horizontal disposition to one of vertical disposition. In FIG. 3, as in FIG. 2, the dark sections represent sections of high temperature. As shown in the figure, the transitional state is generated from the horizontal saturation state to the vertical saturation state in the temperature distribution.

Figure 4:
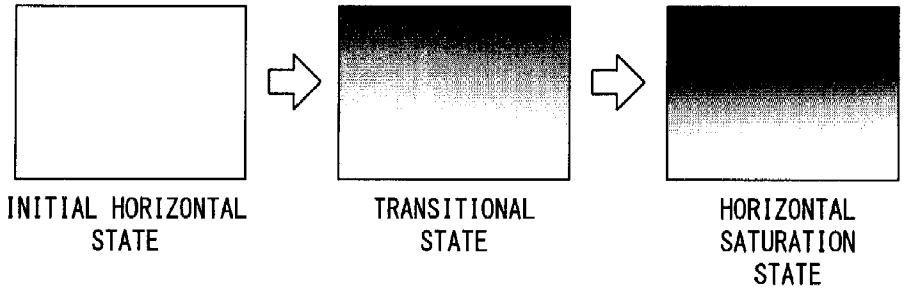

FIG. 4 is a virtual representation of transitions in temperature distribution from the time when the power of the image display apparatus 13 is switched on to a state of saturation while the image display apparatus is horizontally disposed. As shown in the figure, temperature distribution gradually approaches its saturation state with each unit of passing time.

An operation of the image display apparatus will be explained below while referring to the drawings. As shown in FIGS. 1 and 6, the image display apparatus 13 receives a complex image signal at the signal input unit 21. At this time, the complex image signal is in a format suitable for transmission, since it is used in transmitting from the image signal generation apparatus 11 to the image display apparatus 13. It is general to use a format such as an analog RGB signal made by combining an analog video signal and a synchronization signal, and a serial digital signal shown in the DVI (Digital Visual Interface) standard. The signal input unit 21 converts the received complex image signal in a format suitable for transmission to a complex image signal in an easily-processed format. Here, as an easily-processed format, an analog signal is generally used when the subsequent methods are analog, and a parallel digital signal format is generally used when they are digital. While only a digital method is described here to simplify explanation, unless indicated otherwise, the description similarly applies to an analog method.

As a method of converting the format at the signal input unit 21, when the received complex image signal is an analog signal, it is general to use an analog-to-digital conversion circuit (hereinafter ADC circuit) that contains a clock recovery circuit such as a phase-locked circuit (hereinafter PLL) for recovering a clock signal. When the complex image signal is a serial digital signal, a decode circuit specific to the receive signal is generally used. Reception in both analog and digital formats is possible by providing a circuit for each.

The signal input unit 21 outputs the complex image signal Vi which has been converted to an easily-processed format, to the signal-for-display generator 22.

The signal-for-display generator 22 converts the complex image signal Vi input thereto from the signal input unit 21 to a signal that is suitable for displaying at the display unit 24. Specifically, in a matrix-type display apparatus such as an LCD, scaling in which the resolution of an image signal is converted to the resolution of a display element, frequency conversion in which the frequency of the image signal is converted into a range that can be received by a display element, and the like are performed, the required conversion content differing according to the display element.

The signal-for-display generator 22 outputs the image signal Vs, which has been converted to a format suitable for displaying at a display unit, to the non-uniformity corrector 31.

The apparatus state-detector 32 detects the state of the display apparatus. The 'state of the display apparatus' signifies elements that cause transitions in the state of non-uniformity at the display unit 24. The temperature of the display elements is the most dominant factor affecting non-uniformity state transition. By detecting factors that change the temperature distribution in the display elements, non-uniformity state transition can be corrected.

One factor that changes temperature distribution in the display elements is the orientation in which the display apparatus is disposed. FIG. 2 shows a virtual representation of temperature distribution in each of apparatus orientations. As clearly shown in the figure, the temperature increases toward the top, and the non-uniformity affected by temperature is different at the top and bottom.

By providing a unit for detecting the orientation of the apparatus in the apparatus state-detector 32, correction of non-uniformity can be performed in each state. The unit for detecting the orientation of the apparatus generally includes a method of using an acceleration sensor, a method of using a tilt sensor, or the like. Since the aim here is to detect the orientation of an image apparatus, and the image apparatus is unlikely to be used in a diagonal disposition, it is acceptable to use a sensor having comparatively low precision.

As already mentioned, since temperature distribution within the screen differs according to the orientation of the display apparatus, non-uniformity generated in the display elements can be reduced by correcting it accordingly. However, the temperature in the display screen does not immediately change when the screen orientation is changed, and has a transitional state as shown in FIG. 3. If correction is performed while assuming that the display apparatus is disposed in only two orientations, horizontal and vertical, there will be a disparity between the non-uniformity generated according to the temperature distribution of the display elements in the transitional state, and the amount of correction of non-uniformity that is intended to be corrected.

Accordingly, the apparatus state-detector 32 is provided with an apparatus operating-time detector, which makes it possible to ascertain a transitional state by ascertaining the operating time from the change in orientation of the display apparatus, thereby increasing the correction accuracy. Since the time taken until saturation of temperature distribution differs according to the size, capacity, and material of the display elements, a different correction value must be set for each display element.

When the orientation of the apparatus is changed frequently, there may be cases where saturation is not reached. In this case, a transitional state can be estimated by adding/subtracting the time it was used in each orientation and the time taken until saturation, enabling accurate correction even in such cases.

FIG. 4 is temperature distribution of the image display apparatus 13 from the time when its power is switched on to a state of saturation. As clearly shown in the figure, temperature distribution does not change abruptly, and gradually approaches saturation with each unit of passing time. More accurate correction can also be realized for this state transition, by coupling elapsed time with the change in orientation already noted.

Moreover, in correcting the state transition when power is switched on, state transition in the reverse direction can be estimated by detecting the time when power is switched off, and more accurate correction can be realized by having a correction start state when restarting correspond to the off time.

Correction for this state transition after power-on can be estimated from the temperature in the apparatus. Since the temperature in the apparatus increases with time elapsing after power-on and decreases with time elapsing after power-off, the operation elapsed time and off time can be estimated. When using this method, there is no need to measure the time elapsing while the power of the display apparatus is not switched on, achieving an advantage of reducing wasteful power consumption while the apparatus is switched off.

Further, by coupling the elapsed time with the temperature in the apparatus, it becomes possible to estimate state transition in display elements having even more complex transitions in temperature distribution, whereby accurate correction can be achieved.

As described above, the apparatus state-detector 32 detects the orientation of the apparatus, operating time, and the temperature in the apparatus, and outputs the result Dt to the arithmetic unit 33.

Based on the apparatus state information Dt input from the apparatus state-detector 32 as described above, the arithmetic unit 33 determines an amount of non-uniformity to be corrected Ct, and outputs to the non-uniformity corrector 31. Several methods of realizing this are explained below.

In a first method, correction values for non-uniformity in all conditions of states detected by the apparatus state-detector 32 are all stored beforehand, and a correction value to be used is selected based on the input apparatus-state information Dt. While this method is effective, in that precise settings can be made in a display apparatus where non-uniformity tends to randomly generated, it requires a large storage region.

In a second method, correction values for non-uniformity in representative conditions of states detected by the apparatus state-detector 32 are stored beforehand, and, when the input apparatus-state information Dt indicates a state that is between preset apparatus states, a correction value for non-uniformity is generated from correction values of non-uniformity in several similar apparatus states, using a method such as interpolation. In comparison with the first method, this method has a smaller storage region, and is effective when non-uniformity is generated continuously, such as in temperature shifts with respect to each apparatus state. Conversely, since non-uniformity correction values must be stored, it requires a certain amount of storage region.

In a third method, an arithmetic expression using a state detected by the apparatus state-detector 32 as a variable is prepared beforehand. In comparison with the two methods described above, this method is advantageous in requiring hardly any storage region. On the other hand, since the non-uniformity correction value is determined from an arithmetic expression, correction will be greatly in error if the non-uniformity transition is not linear.

Based on a non-uniformity correction amount Ct that corresponds to the position displayed at the display unit, the non-uniformity corrector 31 corrects the image signal Vs input from the signal-for-display generator 22, converts it to a signal format that can be used at the display unit 24, and outputs it. Since the display position can be calculated from a time relation between a synchronization signal and an image signal, correction is generally performed in accordance with the result of that calculation. In an LCD, the format of the signal output to the display unit is generally a digital serial signal called LVDS.

Examples of non-uniformity to be corrected are luminance non-uniformity, color non-uniformity, and gamma characteristic non-uniformity. While a representative correction method for each will be explained below, these are merely representative examples, and similar effects can also be obtained using other methods, provided that they can be used in correcting non-uniformity.

Firstly, correction of luminance non-uniformity will be explained. Luminance non-uniformity is a collapse in the uniformity of luminance in the screen, and is generally corrected by controlling the amplification factor of the image signal. In this case, the non-uniformity is corrected by changing the amplification factor of the image signal at each position in the screen.

Next, correction of color non-uniformity will be explained. Color non-uniformity is a collapse in the uniformity of color in the screen, and is generally corrected by changing the amplification factor of the RGB of the image signal. In this case, the non-uniformity is corrected by changing the balance of the amplification factor of the RGB of the image signal at each position in the screen.

Lastly, correction of gamma characteristic non-uniformity will be explained. Gamma characteristic non-uniformity is a collapse in the uniformity of gamma characteristic in the screen, and is generally corrected by changing the amplification factor of the image signal in accordance with the level of the input signal. In this case, the non-uniformity is corrected by changing the amplification factor of the image signal for each level at each position in the screen.

The display unit 24 receives the image signal Vd output from the non-uniformity corrector 31, and display an image.

The above explanation describes a case where the non-uniformity corrector 31 is arranged in a rear stage of the signal-for-display generator 22. Similar effects are obtained when this positional relationship is reversed, i.e. when the non-uniformity corrector 31 is arranged in a front stage of the signal-for-display generator 22. Since the basic operation is also the same, it will not be repetitiously explained.

According to the configuration of the image display apparatus of the first embodiment, in an image display system such as that shown in FIG. 6, non-uniformity generated at the display apparatus can be corrected at a predetermined level, even when usage conditions change. This makes it possible to provide an image display system that is capable of high-quality display with little non-uniformity, even when used under various conditions. Moreover, there is no need to provide special means for correction because it is achieved by directly processing the image signal, enabling it to be realized at comparatively low cost.

Subsequently, an operation of a second embodiment will be explained. Since the overall configuration of the image display system is the same as that of the first embodiment, as is the operation of the image display system of FIG. 6 and the general operation of the image display apparatus 13, these will not be repetitiously explained.

Figure 5:
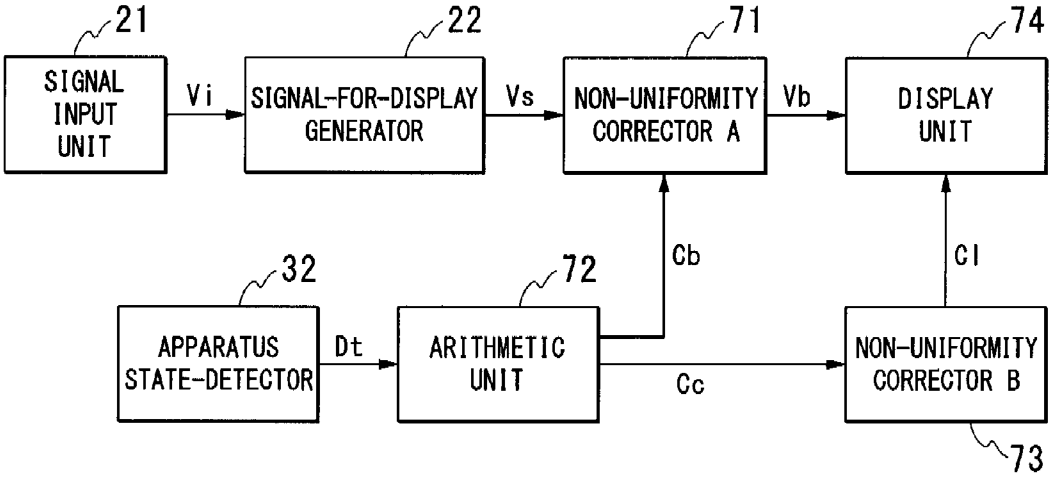
FIG. 5 is a block diagram showing an image display apparatus in a second embodiment of the invention.

A detailed configuration and operation of the second embodiment will be explained below in reference to the drawings. FIG. 5 is a block diagram of the internal configuration of an image display apparatus of the second embodiment. As shown in FIG. 5, this image display apparatus includes a signal input unit 21, a signal-for-display generator 22, a non-uniformity corrector A71, an apparatus state-detector 32, an arithmetic unit 72, a non-uniformity corrector B73, and a display unit 74.

The signal input unit 21 outputs an image signal Vi to the signal-for-display generator 22. The signal-for-display generator 22 generates an image signal Vs, and outputs it to the non-uniformity corrector A71. The non-uniformity corrector A71 corrects the image signal Vs, and outputs a corrected image signal Vb to the display unit 74. The apparatus state-detector 32 outputs information Dt indicating a detected apparatus state to the arithmetic unit 72. The arithmetic unit 72 generates pieces of information Cb/Cc indicating correction amounts for non-uniformity correction, and outputs them respectively to the non-uniformity correctors A71 and B73. A correction amount C 1 created at the non-uniformity corrector B73 is output to the display unit 74.

Subsequently, a detailed operation of the image display apparatus shown in FIG. 5 will be explained. Since the signal input unit 21, the signal-for-display generator 22, and the apparatus state-detector 32 are similar to those of the first embodiment, they are not repetitiously explained.

While the operation of the arithmetic unit 72 is practically identical to that of the arithmetic unit 33 in the first embodiment, since the non-uniformity correctors use a different correction method to that of the first embodiment, the arithmetic unit 72 outputs different formats. To the non-uniformity corrector A71, it outputs correction amount information relating to gamma characteristic non-uniformity and color non-uniformity, whereas to the non-uniformity corrector B72, it outputs correction amount information relating to luminance non-uniformity.

The non-uniformity corrector A71 differs from the non-uniformity corrector 31 in the first embodiment in that it does not have a luminance non-uniformity corrector; since it is otherwise similar, no repetitious explanation is given here.

The display unit 74 displays an image signal based on the image signal Vb output from the non-uniformity corrector A71. The display unit 74 can control its brightness across a matrix of screen positions. Specifically, it is such as an LCD with a direct backlight, and can adjust the light quantity of individual backlights.

The non-uniformity corrector B72 corrects luminance non-uniformity generated at the display unit 74 by using a luminance controller, such as the backlight of the display unit 74, thereby a correction amount being specified for each backlight.

According to the configuration of the image display system of the second embodiment, in an image display system such as that shown in FIG. 6, non-uniformity generated at the display apparatus can be corrected at a predetermined level, even when usage conditions change. It is therefore possible to provide an image display system that is capable of high-quality display with little non-uniformity, even when used under various conditions. Since luminance non-uniformity, which constitutes most of the non-uniformity, is corrected using a backlight, there are advantages in that the image signal can be corrected with a small correction amount, and problems such as reduction in the resolving power due to correction are unlikely.

An input unit for obtaining a timing to change the non-uniformity correction amount in the arithmetic unit from the outside can be provided. The arithmetic unit may monitor the detection result of the apparatus state-detector, and constantly control the non-uniformity correctors so as to reduce non-uniformity generated at the display unit. The arithmetic unit may monitor the detection result of the apparatus state-detector, and, when the state of the apparatus has altered by a fixed amount from the apparatus state of the previous correction, control the non-uniformity correctors so as to reduce non-uniformity generated at the display unit. Further, the arithmetic unit may control the non-uniformity correctors so as to reduce non-uniformity generated at the display unit based on an externally-applied control signal and the detection result of the apparatus state-detector.

INDUSTRIAL APPLICABILITY

The present invention can be applied in an image display apparatus that receives an image signal having a predetermined format used in a personal computer and the like, and displays the received signal at a display device such as a liquid crystal, CRT, plasma display, or electroluminescence, and can realize an image display apparatus that can constantly display a uniform image across an entire screen, as desired by a user.

The invention claimed is:

1. An image display apparatus comprising:

a signal input unit that receives a complex image signal including an image signal having a plurality of frames and a synchronization signal corresponding to the image signal, and outputs the image signal and the synchronization signal;

a signal-for-display generator that converts a signal input from the signal input unit to a signal for displaying with a display element;

a non-uniformity corrector that corrects non-uniformity in the display element;

an apparatus state-detector that detects a state of a display apparatus including the display element, the apparatus state-detector including:

an apparatus-orientation detector that detects first and second orientations in which the display apparatus is disposed, the first and second orientations being different from each other; and an apparatus operating-time detector that detects an operating time of the display apparatus in the first orientation and an operating time of the display apparatus in the second orientation, the apparatus operating-time detector detecting a time when power of the display apparatus is switched off;

an arithmetic unit that calculates a correction amount based on the state of the display apparatus, the state of the display apparatus including:

the orientations in which the display apparatus is disposed;

a relationship among the operating time of the display apparatus in the first orientation, the operating time of the display apparatus in the second orientation, and a time taken until saturation of the display device; and the time when power of the display apparatus is switched off; and a display unit that receives a complex image signal corrected by the non-uniformity corrector, and displays the corrected complex image signal.

2. The image display apparatus according to claim 1, wherein the apparatus state-detector further includes an apparatus-temperature detector that detects a temperature of the display apparatus, the state of the display apparatus further includes the temperature of the display apparatus.

3. The image display apparatus according to claim 1, wherein the arithmetic unit includes a storage unit that pre-stores non-uniformity correction conditions corresponding to states of the display apparatus, and the arithmetic unit compares the non-uniformity correction conditions with a state of the apparatus detected by the apparatus state-detector, selects a non-uniformity correction condition corresponding to a comparison result, and outputs it.

4. The image display apparatus according to claim 1, wherein the arithmetic unit includes a storage unit that pre-stores a portion of non-uniformity correction conditions corresponding to states of the display apparatus, and the arithmetic unit outputs a non-uniformity correction condition by comparing the correction conditions with a state of the apparatus detected by the apparatus state-detector, and performing an arithmetic operation based on a correction condition approximating to a state of the apparatus.

5. The image display apparatus according to claim 1, wherein the arithmetic unit includes a storage unit that pre-stores an arithmetic expression leading to a non-uniformity correction condition corresponding to a state of the apparatus, and the arithmetic unit calculates a non-uniformity correction condition based on a state of the apparatus detected by the apparatus state-detector.

6. The image display apparatus according to claim 1, wherein the arithmetic unit monitors the detection result of the apparatus state-detector, and constantly controls the non-uniformity corrector so as to reduce non-uniformity generated at the display unit.

7. The image display apparatus according to claim 1, wherein the arithmetic unit monitors the detection result of the apparatus state-detector, and, when a state of the apparatus alters by a fixed amount from a state of the apparatus at a previous correction, controls the non-uniformity corrector so as to reduce non-uniformity generated at the display unit.

8. The image display apparatus according to claim 1, wherein the arithmetic unit controls the non-uniformity corrector so as to reduce non-uniformity generated at the display unit, based on an externally-applied control signal and the detection result of the apparatus state-detector.

* * * * *